United States Patent Office 2,758,569
Patented Aug. 14, 1956

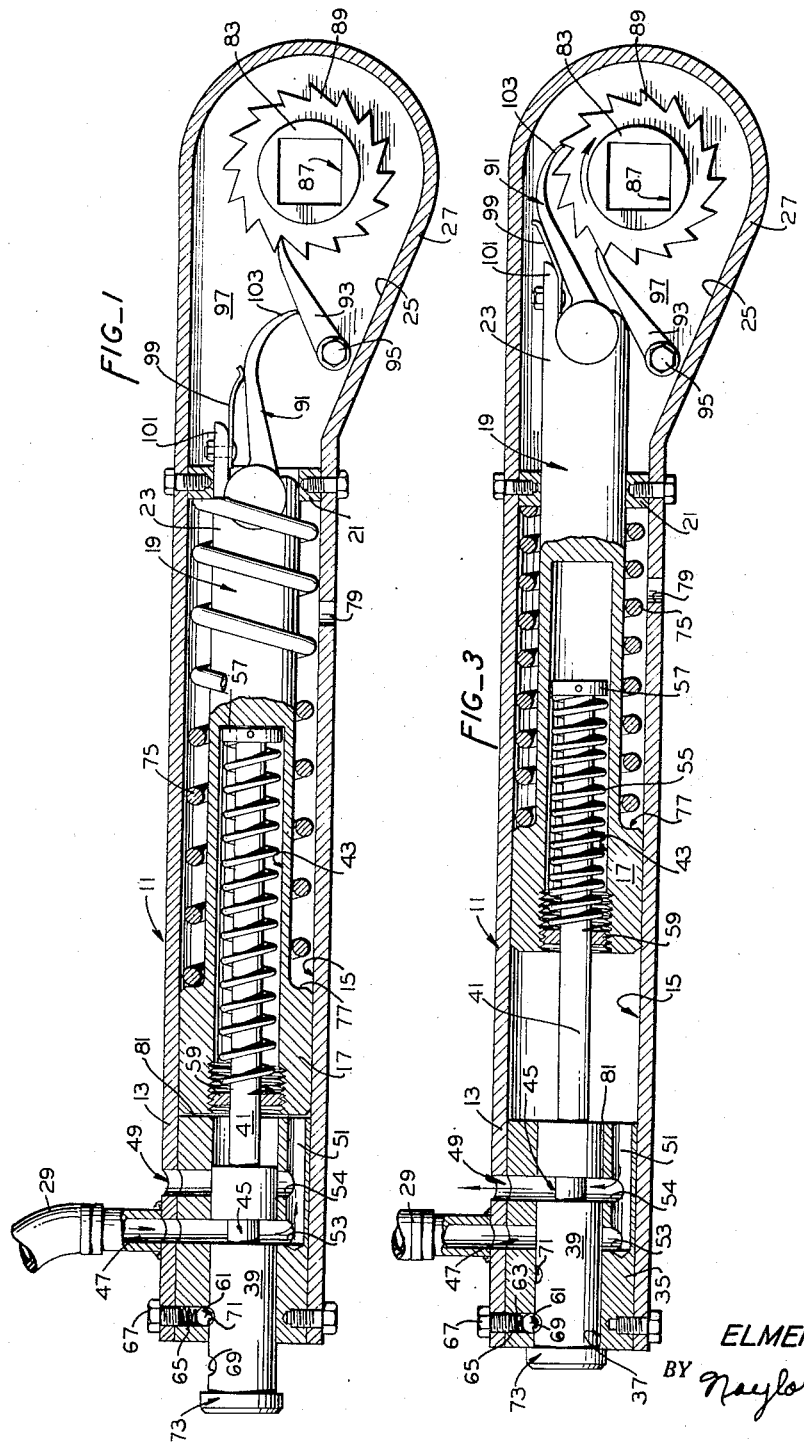

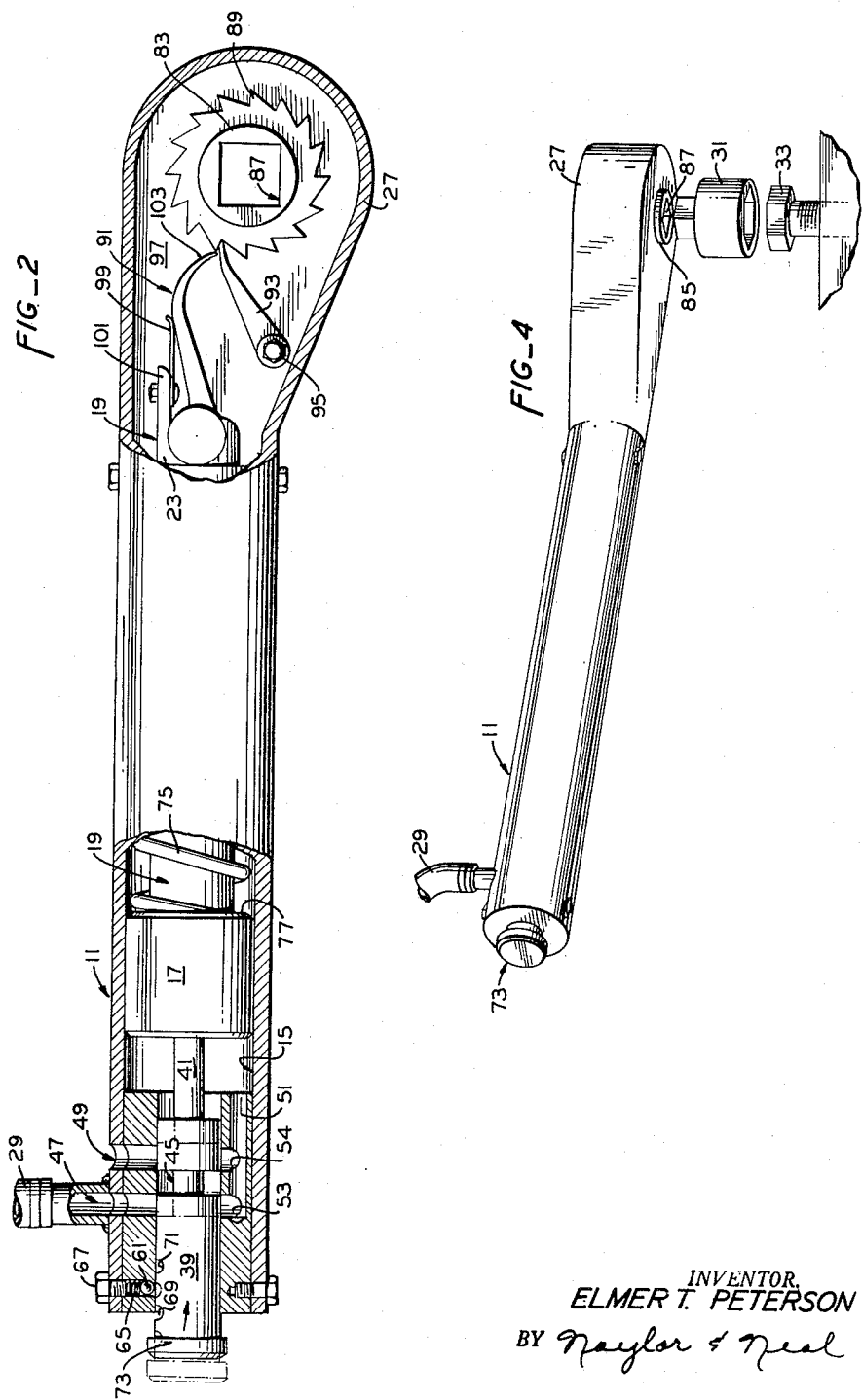

2,758,569

PNEUMATICALLY POWERED TOOL

Elmer T. Peterson, San Bernardino, Calif., assignor of one-half to Sherwood C. Unkefer, San Francisco, Calif.

Application May 31, 1955, Serial No. 511,882

5 Claims. (Cl. 121—3)

This invention relates to power tools, and more particularly to pneumatically powered tools of the type adapted to impart successive rotative movements to an object of work to which the tool is applied.

It is the principal object of the invention to provide, in a tool of the above general character, an improved arrangement wherein a piston is reciprocally driven within a piston chamber, adapted to impart through a piston responsive mean successive rotative forces to the object of work; which arrangement is adapted to permit and to cause the piston to be continuously reciprocated in such manner that forward inertia of the piston after determined forward movement thereof in each power stroke furnishes through the said piston responsive means the successive forces to rotate the object of work.

A further object of the invention is to provide in the arrangement of the tool, above described, a novel arrangement whereby the successive forces provided by the forward inertia of the piston may be regulated according to the rotative force required according to a particular application to which the tool is put, and according to the conditions encountered in such application; as for example, in the use of the tool as a wrench for the removal of a nut "frozen" to the bolt on which said nut is carried.

Still another object of the invention is to provide a tool of the characters stated in which the piston is reciprocated by means including a valve member arranged and adopted responsive to movement of the piston to be moved to two different positions, for admitting air under pressure to the front of the piston to cause the same to be moved in a forward direction, and alternatively for permitting escape of such air and return of the piston, the arrangement being such that the successive forces which are imparted by the piston responsive means to rotate the object of work are determined, respectively, by the inertia force of the piston at that approximate point in its forward stroke wherein the said valve member is shifted from air supply to exhaust position.

Still another object is to provide a tool of the character described which is simple and sturdy in construction and compact in assembly, is inexpensive to manufacture, and is reliable under heavy duty service demands, having a wide variety of applications, and a versatile control arrangement according to the requirements of the given conditions of a particular application.

To the accomplishment of the forgoing objects, the present invention contemplates, as aforesaid, the provision of a tool comprising, generally, a tool casing in which there is provided a piston chamber having a piston reciprocally mounted therein, and, in combination, a novel arrangement of means for reciprocating the piston and means responsive to reciprocative movement of the piston for imparting successive rotative movements to the object to which the tool is applied.

According to its preferred embodiment, the piston reciprocating means comprises a spring means normally urging the piston in one direction within the piston chamber, and a valve means including a valve member arranged and adapted responsive to movement of the piston to be moved to two different positions for admitting air under pressure to the front of the piston to cause the same to be moved in a forward direction against the urge of the said spring means, and alternatively for permitting escape of such air and return of the piston by said spring means; while the piston responsive means comprises a member rotatably mounted at an end of the casing, arranged and adapted to impart rotative movement to the object of work, and ratchet means connecting said piston and rotatably mounted member, arranged and adapted to rotate said member only after said piston has been caused to move forward in its power stroke a given determined distance. In such arrangement, the valve member is arranged and adapted to shift from air supply to exhaust position at approximately that point in the forward stroke of the piston at which further forward movement thereof will cause the ratchet means to rotate the said member; and whereupon inertia of said piston due to its then forward movement will tend to cause the same to move forward in its power stroke further against the urge of said spring means, to be transmitted as continuous successive rotative forces of impact, to rotate the object of work.

In accordance with the foregoing as well as other objects and features, the invention will be seen to consist in the construction, arrangement and combination of the various parts of the tool, all as will be more completely outlined herein, pointed out with particularity in the claims, and illustrated in the accompanying drawings.

To enable others skilled in the art to fully adapt the invention, which is susceptible of a variety of embodiments, for the various applications as a tool without omitting certain features that, from the standpoint of the prior art, fairly constitute essential characteristics of the generic or specific aspects of the invention, a preferred embodiment is disclosed in the annexed drawings, in which:

Figure 1 is a sectional view through the tool, showing the parts thereof in position corresponding to the start of the piston in its power stroke;

Figure 2 is a view, partly in section, showing the piston moved forward in its power stroke to a different position, wherein the valve member is being caused to shift from air supply to air exhaust positions, respectively, and whereupon further forward movement of the piston will cause the ratchet means to be rotated;

Figure 3 is a sectional view showing the valve member in exhaust position and the piston at approximately the end of the power stroke; and Figure 4 is a perspective view of the tool showing the same adapted and equipped as a socket wrench for tightening a nut.

Referring now to the drawings:

The tool consists, generally, of a casing 11 having a tubular body portion 13 in which there is provided a piston chamber 15, and a piston 17 reciprocably mounted therein and having a stem 19 slidably fitted in the guide bearing 21, with its end 23 extending into the chamber 25 of the housing 27. The tubular portion 13 further houses, as will be described in detail, the various elements required for causing the piston 17 to be reciprocated responsive to the operation of the pneumatic cycle, heretofore referred to as the "piston reciprocating means"; while the chamber 25 houses, generally, the various elements required, responsive to reciprocal movement of the piston 17, to impart successive rotative movements to the object of work to which the tool is applied, heretofore referred to as the "piston responsive means." For supplying air under pressure to the tool there is an air hose 29, which is connected to a suitable source of supply, with the usual throttle valve (not shown) of conventional and well known construction for controlling the flow of air to the tool; and, for adapting the tool to the particular applications to which the tool is intended to be used, there are provided suitable devices conventionally designed to be engageable with the tool and the object of work, of which one is shown in Figure 4 as a socket-type attachment 31 for engaging and driving the head of the nut 33.

Piston reciprocating means

In the end of the tubular body portion 13 there is a plug 35 which closes the end of the piston chamber 15 and provides a valve casing. The plug 35 has a longitudinal bore 37 which is in axial alignment with the longitudinal axis of the piston chamber 15, and a valve member 39 is slidably fitted in the bore 37, with its inner end constituting a stem 41 which projects into the piston chamber 15, and into the bore 43 formed in the piston 17.

The valve member 39 has a reduced diameter midportion 45 which, when the valve member is shifted in the plug 35 longitudinally to its air supply position, see Figure 1, is moved to uncover the air supply port 47, formed in the plug 35 and tubular casing portion 13, to communicate with the air supply hose 29; and, when shifted longitudinally to exhaust position, see Figure 3, is moved to uncover an exhaust port 49 formed in the plug 35 and tubular casing portion 13, to atmosphere. An air passageway 51 in the plug or valve casing 35 communicates with the piston chamber 15 and is provided with spaced ports 53, 54, which are separately uncovered by the reduced diameter portion 45 as the valve member 39 is moved between air supply and exhaust positions, respectively, whereby the passage 51 will be in communication with the air supply port 47 and alternately with the air exhaust port 49, respectively.

The piston 17 is operatively connected to the valve member 39 by the valve spring 55 which surrounds the stem 41 within the piston bore 43, and, when the piston 17 is at rest, is maintained under slight tension between the collar 57 secured to the end of the stem 41 and the opposite collar 59 which is screwed into the bore 43 of the piston 17, the collar 59 further serving as a guide for the stem 41. By adjustment of the collar 59 within the bore 43 of the piston 17, adjustment can be made of the tension under which the spring 55 is normally maintained, the purpose of which will be discussed in the operation of the tool, as found later in the specification.

In shifting, the valve member 39 is positioned in either of its two positions by means of the ball 61 which is mounted in the radial bore 63 formed in the plug 39 and casing 11, and controlled by the spring 65 secured in the bore by the screw plug 67 so that the ball is caused to project into the bore 37 of the plug 35 to engage one or the other of the two detents 69, 71, formed in the exterior of the valve member 39. The detents are, as shown, spaced longitudinally corresponding to the spacing between the ports 47, 49, and the valve member 39 is provided with a head 73 which serves to limit movement of the member in shifting to exhaust position, or to the right as viewed in the drawings, and, further, should it be required as means manually effecting a shift of the valve member 39.

Such spring controlled ball 61, of usual arrangement, serves to control the movement of the valve member 39 from air supply to exhaust position and, alternately, from air exhaust to supply positions, until pressure on the member is sufficient to overcome the resistance to longitudinal movement provided thereby.

The piston 17 is normally urged within the chamber 15 in a direction as to engage the plug 35, or to the left as viewed in the drawings, by the piston spring 75 which surrounds the stem 19 and, when the piston 17 abuts the plug 35, is under compression between the bearing 21 and shoulder 77 of the piston. The hole 79 in the casing 11 is provided, as shown, for open communication of the piston chamber 15 coming between the bearing member 21 and the piston shoulder 77 with the atmosphere.

It will now appear that, from the foregoing arrangement, and first considering the piston reciprocating elements in their respective positions shown in Figure 1 wherein the valve member 39 is in air supply position, as air under pressure is supplied to the front of the piston 17 through the passageways 47, 45, 53, and 51, the piston will be caused to move forward, or to the right, in its power stroke against the urge of the piston spring 75, compressing the valve spring 55. As the valve spring 55 is further compressed, the spring will overcome the resistance of the ball 61 in the detent 71 (and also the force exerted by the air in the piston chamber 15 against the shoulder 81 of the valve member), whereupon the valve member 39 will be shifted to the right to air exhaust position, see Figure 3, with the ball 61 engaged in the detent 69 and the piston chamber 15 in open communication with the atmosphere through the passageways 51, 54, 45 and 49.

Due to the inertia of the piston 17 from its forward movement, at the point in its forward or power stroke whereat there is effected the shifting of the valve member 39 to air exhaust position, the piston 17 will tend to continue to move forward in its power stroke further compressing the spring 75, after which the spring 75 will force the piston 17 to the left in its return stroke. As the piston 17 is moved in its return stroke by the spring 75, the valve spring 55 will be removed from compression and as the piston approaches the plug 35 will be placed under tension whereby it will overcome the resistance of the ball 61 engaged with the detent 69, the valve member 39 shifting to engage the ball 61 in the detent 71 to position the valve member 39 in air supply position, whereupon the pneumatic cycle is repeated.

By adjustment of the screw plug 67, the resistance to longitudinal movement of the valve member 39 provided by the spring urged engagement of the ball 61 in the detents 69 and 71, respectively, may be regulated to control the shift of the valve member, responsive to given movement of the piston 17, as aforedescribed, and accordingly the stroke of the piston.

Piston responsive means

A member 83 is rotatably supported in the chamber 25, which member is preferably in the form of a shaft whose ends project through openings in the end of the casing slightly beyond the outside thereof, and on either side of the housing 27, one such end 85 being shown in Figure 4. The respective openings in the housing 27 may be provided with the usual bushing, not shown, or bearing for the rotatable support of the shaft; and each of the respective shaft ends 85 is formed with an opening or socket 87, of conventional and well known shape to receive the end of the particular device 31 when employed with the tool for a particular application or use thereof. It will be understood that while the socket 87 is shown in the drawings as square in cross-section it may be of other shape corresponding to the shape of the male end portion of the device 31, and that the socket 87 may further extend all the way through the shaft 83.

Within the chamber 25 a ratchet gear 89 is carried by and fixed to the shaft 83, such that rotation of the ratchet will rotate the shaft. At the end 23 of the piston shaft 19 there is pivotally mounted a ratchet finger 91, and a ratchet pawl 93 is pivotally supported on the bolt 95 screwed to the bottom wall 97, which pawl engages the ratchet 89 to prevent backward rotation of the ratchet and attached parts. The ratchet finger 91 is urged by the spring 99, secured to the piston stem projection 101, whereby the outer end 103 is adapted to engage and ride along the pall 93, to engage the ratchet 89, substantially as shown in the respective Figures 1 through 3 of the drawings. A pall spring, not shown, may also be provided to urge the pall in engagement with the ratchet 89 when the ratchet finger 91 is moved around to the position shown in Figure 3.

As will be apparent from Figures 1 and 2 of the drawings, the respective length of the piston 17 and stem 19, and the ratchet finger 91 is such that the piston may be caused to move forward in its power stroke a distance shown in Figure 2 before the end 103 of the ratchet finger will engage a tooth of the ratchet 89, whereupon further forward movement of the piston will rotate the ratchet and attached parts.

In accordance with the foregoing arrangement, the characteristics of the respective piston spring 75, valve spring 55, and spring 65 urging the ball 61 in engagement with the detents 69, 71, may be and are so selected that when the piston 17 is moved forward in its power stroke occasioning as described hereinbefore a shifting of the valve member 39 from air supply to air exhaust position, the position of the piston at the moment the valve member is so shifted will present the end 103 of the ratchet finger for engagement with a tooth of the ratchet, substantially as shown in Figure 2.

Operation

From the foregoing description of the "piston reciprocating means" and the "piston responsive means," the operation of the tool will be apparent.

By way of example, and with reference to Figure 4, when the device 31 has been attached to the shaft 83, with its socket engaged about the head of bolt 33, rotative force will be imparted to the bolt 33 corresponding to the forward inertia of the piston 17 when the valve member 39 is shifted from air supply to air exhaust position. Such inertia urges the piston further forward in its power stroke, against the urge of the spring 75, whereupon the ratchet finger 91 causes the ratchet 89 to rotate, and in turn rotating the device 31 and bolt 33. When the force of the forward inertia of the piston is absorbed in overcoming the resistance of the bolt 33 to rotative movement, and by compression of spring 75 during the respective further forward movement of the piston in effecting a rotation of the bolt 33, the piston will be caused to be moved in its return stroke by the spring 75, effecting a shifting of the valve member 39 from air exhaust to air supply position, whereupon the cycle is repeated.

According to a principle of the operation, should the forward inertia of the piston, which normally causes a rotation of the ratchet 89 upon such further forward movement of the piston 17 as above described, be less than that required to "free" the threads of the bolt 33, permitting the bolt to be rotated, the piston 17 will nonetheless be caused to reciprocate whereupon the successive forces due to the forward inertia of the piston in each of its power strokes will be imparted to the bolt 33 as successive rotative forces of impact which will tend to "free" the bolt 33, and whereupon the tool then will effect rotation of such bolt.

Additionally, the adjustment of the screw plug 67, regulating the resistance provided by engagement between the ball 61 and detents 69, 71, respectively, to longitudinal movement of the valve member 39, both the length of the forward stroke of the piston 17 required to effect a compression of the valve spring 55 and shifting of the valve member 39 from air supply to air exhaust position, and the resultant further forward movement of the piston 17 due to its forward inertia when such shifting of valve member 39 is effected, may be regulated as desired, and according to the particular application to which the tool is put.

As changes in the construction and arrangement of the parts will be readily apparent to those skilled in the art, which changes may be made without departing from the real spirit and purpose of the invention, it is intended to cover by the following claims any modified forms of structure or use of mechanical equivalence, which may be reasonably included within their scope.

What is claimed is:

1. A power tool for imparting successive rotative movements to an object to which the tool is applied comprising, in combination, a casing having a piston chamber, a piston reciprocally mounted in said chamber, means responsive to forward movement of the piston within said chamber, arranged and adapted to impart a rotative movement to the object of work, and means for reciprocating said piston within said chamber including means normally urging said piston to one direction within the chamber, and valve means including a valve member arranged and adapted responsive to movement of the piston to be moved to two different positions, for admitting air under pressure to the front of the piston to cause the same to be moved in a forward direction against the urge of the said piston urging means, and alternatively for permitting escape of such air and return of the piston; said piston responsive means and said piston reciprocating means being characterized by the arrangement wherein the valve member is movable between the said two positions, from air supply to exhaust, as said piston is moved forward under air pressure in its power stroke, whereupon inertia of said piston due to its then forward movement will tend to cause the same to move forward in its power stroke further against the urge of said piston urging means, and wherein said piston responsive means is adapted to impart rotative movement to the object of work with which the tool is used only upon such further forward movement of the piston.

2. A power tool for imparting successive rotative movements to an object to which the tool is applied comprising, in combination, a casing having a piston chamber, a piston reciprocally mounted in said chamber, means responsive to forward movement of the piston within said chamber, arranged and adapted to impart a rotative movement to the object of work, and means for reciprocating said piston within said chamber including means normally urging said piston in one direction within the chamber, and valve means including a valve member arranged and adapted responsive to movement of the piston to be moved to two different positions, for admitting air under pressure to the front of the piston to cause the same to be moved in a forward direction against the urge of the said piston urging means, and alternatively for permitting escape of such air and return of the piston; said piston responsive means and said piston reciprocating means being characterized by the arrangement wherein the valve member is movable between the said two positions, from air supply to exhaust, as said piston is moved forward under air pressure in its power stroke, and from exhaust to air supply, as said piston is moved in its return stroke by said piston urging means; and wherein said piston is movable further forward in its power stroke, against the urge of said piston urging means, due to the forward inertia of the piston after said valve member has shifted from air supply to exhaust, and said piston responsive means is adapted to impart rotative movement to the object of work with which the tool is used only upon such further forward movement of the piston.

3. A power tool for imparting successive rotative movements to an object to which the tool is applied comprising, in combination, a casing having a piston chamber, a piston reciprocally mounted in said chamber, means responsive to forward movement of the piston within said chamber, arranged and adapted to impart a rotative movement to the object of work, means for reciprocating said piston within said chamber including means normally urging said piston in one direction within the chamber, and valve means including a valve member arranged and adapted responsive to movement of the piston to be moved to two different positions, for admitting air under pressure to the front of the piston to cause the same to be moved in a forward direction against the urge of the said piston urging means, and alternatively for permitting escape of such air from the chamber and return of the piston by said piston urging means, said valve member movable between the two said positions from air supply to exhaust as said piston is moved forward under air pressure in its power stroke and from exhaust to air supply as said piston is moved in its return stroke by said piston urging means, said piston movable further forward in its power stroke against the urge of said piston urging means due to the forward inertia of the piston when said valve member is shifted from air supply to exhaust, and said piston responsive means adapted to impart rotative movement to the object of work to which the tool is applied only after a given forward movement of said piston in its power and upon such further forward movement of the piston due to its said forward inertia.

4. The power tool according to claim 3 wherein the valve member is caused to shift from air supply to exhaust as said piston is moved forward in its power stroke for approximately the same given forward movement beyond which further forward movement of the piston will impart rotative movement to the object of work, whereby as the piston as caused to reciprocate within the piston chamber the successive forces provided by the said forward inertia of the piston at that point in its power stroke at which the valve member is caused to shift from air supply to exhaust, will be transmitted as continuous successive rotative forces of impact, to rotate the object of work.

5. The power tool according to claim 4 wherein the piston reciprocating means includes means engageable with the valve member, adapted to resist longitudinal movement of the valve member, in shifting between the two respective positions responsive to a given longitudinal movement of the piston in its respective power and return strokes, said valve member engaging means being manually adjustable to vary the resistance effected thereby to said longitudinal movement of the valve member, to vary the stroke of the piston in causing a shifting of the valve member and to vary the forward inertia of the piston at that point in its power stroke when at which the valve member is caused to shift from air supply to exhaust.

No references cited.